United States Patent [19]

Schakowsky et al.

[11] Patent Number: 4,989,233

[45] Date of Patent: Jan. 29, 1991

[54] SYSTEMS FOR CAPTURING TELEPHONIC MASS RESPONSES

[75] Inventors: Harvey E. Schakowsky, Los Angeles, Calif.; Gilbert W. Bell, Lilburn, Ga.

[73] Assignee: Evanston Enterprises, Inc., Studio City, Calif.

[21] Appl. No.: 424,804

[22] Filed: Oct. 20, 1989

Related U.S. Application Data

[63] Continuation-in-part of Ser. No. 336,657, Apr. 11, 1989.

[51] Int. Cl.⁵ ......................... H04M 1/57; H04M 3/50
[52] U.S. Cl. ........................................ 379/92; 379/97; 379/113; 379/84; 379/219; 379/246; 379/142
[58] Field of Search ..................... 379/92, 96, 97, 88, 379/89, 113, 201, 219, 84, 77, 104, 105, 245, 246, 142

[56] References Cited

U.S. PATENT DOCUMENTS

| | | |
|---|---|---|
| 3,614,328 | 10/1971 | McNaughton . |
| 3,644,675 | 2/1972 | Watlington ........................... 379/92 |
| 3,803,491 | 4/1974 | Osborn . |
| 4,001,508 | 1/1977 | Johnson . |
| 4,320,256 | 3/1982 | Freeman . |
| 4,355,372 | 10/1982 | Johnson et al. . |
| 4,397,030 | 8/1983 | Becker et al. . |
| 4,451,700 | 5/1984 | Kempner et al. . |
| 4,489,438 | 12/1984 | Hughes . |
| 4,539,435 | 9/1985 | Eckmann . |
| 4,541,087 | 9/1985 | Comstock . |
| 4,558,444 | 12/1985 | Kennedy et al. . |
| 4,584,602 | 4/1986 | Nakagawa . |
| 4,649,563 | 3/1987 | Riskin . |
| 4,654,482 | 3/1987 | DeAngelis . |
| 4,696,029 | 9/1987 | Cohen . |
| 4,757,267 | 7/1988 | Riskin . |
| 4,792,968 | 12/1988 | Katz . |
| 4,800,583 | 1/1989 | Theis ..................... 379/67 |
| 4,845,739 | 7/1989 | Katz . |

OTHER PUBLICATIONS

Creative Telecom, Inc. Applications (Brochure).
Richard Edel, "One-Call Polling Offers Instant Answer", Special Reports.
Gary Slutsker, "Relationship Marketing", Forbes (Apr. 3, 1989 pp. 145–147).
Martha Groves, "Penney Will Fold Cable Shopping Experiment", Los Angeles Times (Mar. 31, 1989 Part IV pp. 2, 4).
Paul Desmond, "Telemarketing Service Aids TV Advertising Campaigns", Network World (Jul. 17, 1989 pp. 11, 12).

Primary Examiner—Jin F. Ng
Assistant Examiner—Stella L. Woo
Attorney, Agent, or Firm—David Weiss; Luc P. Benoit

[57] ABSTRACT

Recipients of a promotion broadcast over an essentially one-way mass medium are prompted to respond thereto through their telephone sets having different subscriber telephone numbers, and the task of handling the resulting mass response is divided into a call receiving phase and a subsequent response completing phase. Such call receiving phase is shortened relative to the response completing phase by automatically receiving calls of recipients using their telephone sets to respond to the broadcast promotion, electronically capturing the subscriber telephone numbers of the telephone sets through which these calls are made, and automatically confirming to substantially all callers while on line during these calls that their calls have been received. The response completing phase is subsequently carried out by using the electronically captured subscriber telephone numbers to call on multitudes of the telephone sets at a time, electronically prompting all persons who answer the calls on these multitudes of telephone sets to complete their responses to the broadcast promotion through their telephone sets while on line, and automatically receiving the completed responses while on line with these persons through their telephone sets. In one system embodiment, a plurality of subsystems are geographically distributed over a wide area, and each subsystem of the plurality carries out both the call receiving phase and the response completing phase for calls received by a particular subsystem. Each subsystem stores information generated by and received through such subsystem, and the stored information is polled from a centralized location.

38 Claims, 2 Drawing Sheets

SYSTEMS FOR CAPTURING TELEPHONIC MASS RESPONSES

CROSS-REFERENCE TO RELATED PATENT APPLICATION

This application is a continuation-in-part of co-pending U.S. patent application Ser. No. 07/336,657, filed Apr. 11, 1989, which prior-filed application has been assigned to and is owned by the assignee of the present application.

FIELD OF THE INVENTION

The subject invention relates to interactive communication systems and, more particularly, to systems for capturing telephonic mass responses, and to methods and apparatus for enhancing a telephonic response to promotions broadcast over mass media.

BACKGROUND OF THE INVENTION

An ongoing frustration of those who would like to organize help on a big scale has been that while it is possible to reach millions of homes via television, it has been almost impossible to capture the full public response by the many people who would like to help victims of a major calamity or of an affliction of great public concern. Despite the existence of some interactive television systems, mass media capable of reaching millions of people simultaneously essentially are of a one-way nature. The existence of nationwide and transcontinental telephone systems may have created the illusion that the telephone can easily provide a return path, in parallel to any one-way mass medium, for all those who want to respond to a plea for help or to other broadcast material. That impression may be fortified by the frequent occurrence of promotional television programs in which viewers are prompted by the display of a phone number to respond to a broadcast through their telephone sets. However, those who are using that approach have come to know that it by no means provides a two-way street, but only a limited path backwards in response to an immense current forward.

In this respect, researchers in the promotional broadcast field have come to know that most viewers who want to respond by telephone will attempt to do so within less than two minutes after a broadcast stimulus therefor. By way of representative example, over eighty-five percent of all such phone calls will be attempted during the first ninety seconds, followed by ten to fifteen percent within the next five minutes. After this period, the call volume for a given broadcast stimulus will virtually disappear. Prior-art phone systems have been incapable of accommodating within a couple of minutes the myriads of phone calls attempted by viewers in response to a widely broadcast prompt or stimulus Add to this the problem that only a minority will attempt to re-dial the broadcast phone number, when they receive a busy signal. In practice, the percentage of those who will attempt another call is dependent upon several variables which, as known in commercial promotion, include the perceived quality of the product or service, the competitive posture of the product or service from alternate channels of distribution and manufacturers, and the strength and duration of memory recall of the offer and the toll-free number broadcast. By way of representative example, applicable also to the telethon field, only some forty per cent of all callers will attempt to redial the broadcast phone number if they receive a busy signal. This percentage is halved each time the busy signal is again encountered, to disappear asymptotically with the fourth attempt to reach the busy phone number.

This means that many promotions for civic or charitable purposes either remained lofty goals without substantial return, or then had to be so hard hitting and repetitive as to become in effect a nuisance to many television viewers and radio listeners.

The same applies to the commercial arena, where commercial messages and advertisements have become so numerous as to annoy on the one hand and lose their efficacy on the other hand. This has called for a significant shift away from advertising in favor of promotion with value-added propositions. Such promotions have gone nationwide, but the effect has been like that of a giant rectifier: substantially all the current has flown one way, true to the nature of television and broadcast radio as a one-way mass medium, with very little current flowing the other way. As in a commercial rectifier, some current can flow the other way, and television viewers and radio listeners, indeed, have been able to use their telephones in pledging their charitable or other contributions, placing their orders, or otherwise responding to broadcast programs or promotions.

However, what is needed here is not a leaky rectifier, but a strong bi-directional or, nationwide, omni-directional system in which information generated by a broadcast promotion can flow back from the viewers and listeners' homes completely and instantaneously, rather than through prior-art bottlenecks caused by busy operators, phone systems inadequate to the task, and above all, an eventually unsuccessful attempt to produce a large-scale response system by multiplying a telephonic response methodology that for a long time worked reasonably well with local shops and other small-scale situations. However, as in other areas of technology, just doing "more of the same thing" has not solved the problem.

That the capability to do better exists may, for instance, be seen from the recent article by Gary Slutsker in FORBES MAGAZINE (Apr. 3, 1989, pp. 145–47) entitled *Relationship Marketing*, and describing in part ideas conceived by the subject inventors, and being herewith incorporated by reference herein.

The capability of public telephone systems to capture callers' phone numbers is at least as old as electronic dialing. In fact AT&T has had an automatic number identification system (ANI) for some time. Moreover, automatic telephone number dialing systems also have been known for some time. "Pay-per-view" TV systems not only have captured subscribers' telephone numbers, but have asked them at the same time by synthesized voice to key-in their choice through the pushbutton dialing facility now present at the majority of telephone sets.

Despite such capability and potentials, the reality of telemarketing has not been encouraging. As reported on Mar. 31, 1989 in the LOS ANGELES TIMES, Part IV, pp. 2 and 4, the leading mass merchandiser J. C. Penny announced its decision to "pull the plug" on Telaction, its interactive home shopping service that was being tested in the Chicago area. Telaction provided cable television viewers with an electronic shopping mall. Using a touch-tone telephone, viewers could choose a category of merchandise, browse the offerings from a particular store and make selections. An array of prestigious merchants participated in the service, including Neiman Marcus Group, Marshall Field's, Sears, catalogue house Spiegel Inc., Dayton Hudson, Galleries Lafayette of France, and La Rinascente of Italy.

Reported reasons for the adverse decision were an "innovative but cumbersome" technology with an unsatisfactory rate of return customers.

Neither of the two interactive systems reported in that LOS ANGELES TIMES article as remaining after Telaction closes, uses the "Touch Tone" telephone. Rather, a joint venture of Sears Roebuck and IBM, called "Prodigy," is activated by subscribers on personal computers.

GTE is also doing limited testing in Boston of an interactive service called "Main Street." Users access the service through a television cable using a remote control. Unlike Telaction, "Main Street" does not require a touch-tone phone and does not make subscribers share a party line.

In a different vein, recent systems that call on telephone subscribers en masse with various solicitations have been creating quite a nuisance, and there is a need to replace such unsolicited calling systems by systems which will not make calls unless the called party has in some manner indicated that such calls are authorized.

SUMMARY OF THE INVENTION

It is a general object of this invention to overcome the disadvantages, problems or shortcomings and to meet the needs expressed or implicit in the above background statement and in other parts hereof.

It is a germane object of this invention to provide improved systems for capturing telephonic mass responses.

It is a related object of this invention to provide improved systems for capturing telephonic mass responses to promotions broadcast by such mass media as radio and television.

It is also an object of this invention to provide methods and apparatus for enhancing the response to broadcast promotions.

It is a related object of this invention to provide improved systems in which completion of mass responses to broadcast promotions, such as a taking of an order or a pledge, does not interfere with the capturing of a telephonic mass response to such promotion.

It is also an object of this invention to provide overall concepts which will encourage telephone systems to use their technology and potential in a novel way and in novel combinations.

It is a further object of this invention to limit telephone mass calling systems to calls for which called parties have indicated some advance authorization.

Other objects of the invention will become apparent in the further course of this disclosure.

From one aspect thereof, the subject invention resides in a method of enhancing response to a promotion broadcast over an essentially one-way mass medium, wherein recipients of that broadcast promotion are prompted to respond thereto through their telephone sets having different subscriber telephone numbers. The method according to this aspect of the invention comprises, in combination, the steps of dividing that method into a call receiving phase and a response completing phase carried out at least minutes after termination of that call receiving phase, shortening the call receiving phase relative to the response completing phase by automatically receiving calls of recipients using their telephone sets to respond to the broadcast promotion, electronically capturing the subscriber telephone numbers of the telephone sets through which these calls are made, and automatically confirming to substantially all callers while on line during these calls that their calls have been received, and subsequently carrying out the response completing phase by using the electronically captured subscriber telephone numbers to return the calls, prompting all persons who answer the calls on telephone sets to complete their responses to the broadcast promotion through their telephone sets while on line, and receiving the completed responses while on line with these persons through their telephone sets.

From a related aspect thereof, the subject invention resides in a method of enhancing response to a broadcast promotion, comprising, in combination, the steps of broadcasting the promotion over an essentially one-way mass medium, prompting recipients of that broadcast promotion to respond thereto through their telephone sets having different subscriber telephone numbers, automatically receiving calls of recipients using their telephone sets to respond to that broadcast promotion, electronically capturing the subscriber telephone numbers of the telephone sets through which these calls are made, and automatically confirming to substantially all callers while on line during these calls that their calls have been received, subsequently using the electronically captured subscriber telephone numbers to call on multitudes of the telephone sets at a time until substantially all of said calls have been returned, electronically prompting all persons who answer the calls on such multitudes of telephone sets to complete their responses to the broadcast promotion through their telephone sets while on line, and automatically receiving the completed responses while on line with these persons through their telephone sets.

Also from a related aspect thereof, the subject invention resides in apparatus for enhancing response to a promotion broadcast over an essentially one-way mass medium wherein recipients of that broadcast promotion are prompted to respond thereto through their telephone sets having different subscriber telephone numbers, and, more specifically, resides in the improvement comprising, in combination, receiving means for receiving calls of recipients of the broadcast promotion using their telephone sets to respond to that broadcast promotion, capturing means connected to these receiving means for capturing the subscriber telephone numbers of the telephone sets through which the calls are made, means connected to the receiving means for confirming to substantially all callers while on line during the calls that their calls have been received, and means for returning said received calls, including, in combination, means connected to the capturing means for calling with the captured subscriber telephone numbers on multitudes of the telephone sets at a time, means for prompting all persons who answer the calls on the multitudes of telephone sets to complete their response to the broadcast promotion through their telephone sets while on line, and means for receiving the completed responses while on line with these persons through their telephone sets.

In one manner of practicing the method of enhancing response to a promotion broadcast over an essentially one-way mass medium, where recipients of that broadcast promotion are prompted to respond thereto through their telephone sets having different subscriber telephone numbers, the method comprises, in combination, the steps of dividing the method into a call receiving phase and a response completing phase carried out at least minutes after termination of the call receiving phase; shortening the call receiving phase relative to the response completing phase by, at a plurality of locations, automatically receiving calls of recipients using their telephone sets to respond to the broadcast promotion, electronically capturing the subscriber telephone numbers of the telephone sets through which the calls are made, and automatically confirming to substantially all callers while on line during the calls that their calls have been received; subsequently carrying out the response completing phase by, at the plurality of locations, using the electronically captured subscriber telephone numbers to return the calls, prompting all persons who answer the calls on telephone sets to complete their responses to the broadcast promotion through their telephone sets while on line, and receiving the completed responses while on line with the persons through their telephone sets; and communicating with the plurality of locations and polling information generated by the received calls and the returned calls. The carrying out of the response completing phase preferably includes the step of storing, at each of the locations, information generated by the received calls and the returned calls for facilitating the polling step, and this manner of practicing the method further includes the step of processing the polled information.

From a related aspect, such manner of practicing the method of the invention for enhancing response to a broadcast promotion, comprises, in combination, the steps of broadcasting the promotion over an essentially one-way mass medium; prompting recipients of that broadcast promotion to respond thereto through their telephone sets having different subscriber telephone numbers; at a plurality of locations, automatically receiving calls of recipients using their telephone sets to respond to the broadcast promotion, electronically capturing the subscriber telephone numbers of the telephone sets through which the calls are made, and automatically confirming to substantially all callers while on line during the calls that their calls have been received; at such plurality of locations, subsequently using the electronically captured subscriber telephone numbers to call on multitudes of the telephone sets at a time, electronically prompting all persons who answer the calls on the multitude of telephone sets to complete their responses to the broadcast promotion through their telephone sets while on line, and automatically receiving the completed responses while on line with the persons through their telephone sets; and communicating with the plurality of locations and polling information generated by the received calls and the returned calls. This manner of practicing the method preferably includes, at each of the locations, the step of storing information generated by the received calls and the returned calls, and further includes the step of processing the polled information.

In an embodiment of system apparatus for implementing this manner of practicing the method of the invention, a plurality of subsystems are geographically distributed over a wide area (e.g. nationwide) for both receiving calls from and returning calls to recipients of the broadcast promotion. Each of the subsystems of the plurality includes receiving means for receiving calls of recipients of the broadcast promotion using their telephone sets to respond to the broadcast promotion, capturing means connected to the receiving means for capturing the subscriber telephone numbers of the telephone sets through which the calls received by the receiving means are made, means connected to the receiving means for confirming to substantially all callers to the subsystem while on line during the received calls that their calls have been received, and means for returning the received calls. The means for returning the received calls, included by each subsystem of the aforementioned plurality of subsystems, includes in combination means for calling on multitudes of the telephone sets at a time using the subscriber telephone numbers captured at that subsystem, means for prompting all persons who answer the calls on such multitudes of telephone sets to complete their responses to the broadcast promotion through their telephone sets while on line, and means for receiving the completed responses while on line with such persons through their telephone sets. Each of the subsystems preferably includes storage means for storing information generated by and received through the respective subsystems. The subject embodiment of system apparatus for practicing the invention further includes polling means for communicating with each of the subsystems of the plurality of subsystems (e.g. with the storage means of each of the subsystems) and for polling information generated by and received through the subsystems, along with processing means for processing information polled by the polling means.

BRIEF DESCRIPTION OF THE DRAWING

The subject invention and its aspects and objects will become more readily apparent from the following detailed description of preferred embodiments thereof, illustrated by way of example, in the accompanying drawing, in which like reference numerals designate like or equivalent parts, and in which.

DESCRIPTION OF PREFERRED EMBODIMENTS

Figure 1:
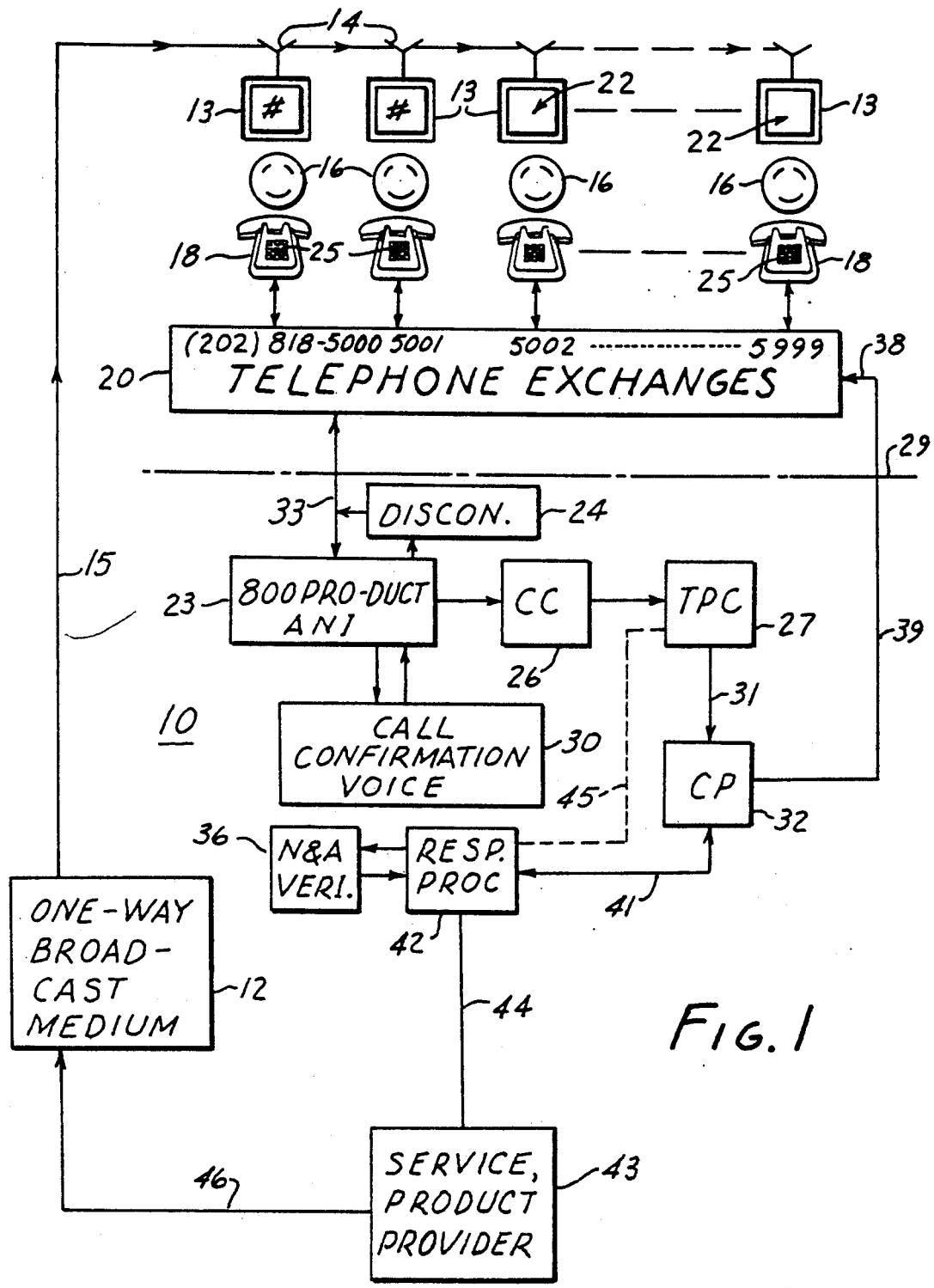
FIG. 1 is a block diagram of a promotional broadcast and telephonic mass response capturing and processing system according to a preferred embodiment of the subject invention.

FIG. 1 illustrates a method and shows a system 10 for enhancing response to a broadcast promotion. As indicated at 12, this method includes broadcasting the promotion over an essentially one-way mass medium, notably radio or television using broadcast receivers 13. Television sets are symbolically shown for that purpose, but radio sets are also within the scope of the subject invention. While broadcast signal receiving antennas 14 are symbolically shown, the one-way channel 15 over which the broadcast promotion is transmitted may include cable or wireless systems or a combination thereof.

Recipients 16 of that broadcast promotion, such as television viewers or radio listeners, are prompted to respond thereto through their telephone sets 18 having different subscriber telephone numbers, as indicated by way of example within the block 20, symbolizing exchanges of a typical telephone system.

It is the goal of the subject invention to automatically receive substantially all calls of recipients using their telephone sets to respond to the broadcast promotion, symbolized in FIG. 1 by a reference numeral 22 pointing at the television screens. Of course, we realize that this means hundreds of calls a second in the case of promotions broadcast over a wide area. No existing system of human operators or callers' voice recorders could handle that. At best, all lines would go busy for minutes after the first flurry of calls, whereby the bulk of the people responding to a broadcast promotion stimulus would simply be missed. In terms of the above mentioned representative example, when over eighty-five percent of all phone calls are attempted during the first ninety seconds after the promotional stimulus, it is clear that even a two-minute busy condition would be devastating to the success of the promotion, inasmuch as only a minority will attempt to redial the broadcast telephone number, when they receive a busy signal. That minority quickly goes down to zero when further busy conditions are encountered. As apparent from the above mentioned Forbes Magazine article, the technology to do better than that is here, but the invention to do better than that was not; for it is one thing for a telephone company to put in enough equipment to receive substantially all calls, but quite another thing to prevent the system from becoming busy in a matter of seconds nevertheless.

The subject invention solves that problem by electronically capturing the subscriber telephone numbers of the telephone sets 18 through which the calls are made, and automatically confirming to substantially all callers 16 while on line during those calls that their calls have been received. Of course, the subject invention is a combination of elements which have to cooperate to solve the problem and to enhance response to a broadcast promotion to a significant level above and beyond that of the prior art. In its purest form, that electronic capturing of the callers' telephone numbers and automatic call confirmation while on line, reduces to a minimum the useful duration of time during which a flurry of calls could keep the system busy in the wake of a broadcast promotional stimulus. This thus yields the lowest possible functional duration of time during which such a flurry of calls could keep the system busy in the wake of a broadcast promotional stimulus. Accordingly, while that is only one element of the combination required according to the subject invention, it is certainly an important one that enables the function of the next element more fully disclosed below.

Reverting for the moment to the first element so far discussed, it may be noted that one way to prompt viewers 16 to respond to a broadcast promotion is to display the phone number secured or used by the promoter or by the operator of the promotion for that purpose. Number signs (#) are shown in the television sets 13 to indicate such a prompt. Also, FIG. 1 in its block 23 shows a toll-free telephone number as (800) PRO-DUCT for that purpose. A similar audible prompt could be broadcast in the case of radio promotions.

Accordingly, if any viewer 16 dials that toll-free number then the system will already know at point 23 that such callers 16 are responding to the broadcast promotion 22. A so-called "900" number or another non-toll-free number could be used instead.

Most existing systems would start talking at that point of time, either by having a human operator or a telephone answering machine or other recording device take the call. In existing systems, this would involve asking the caller in some manner to identify him or herself through name, address and/or phone number as a minimum. All this takes time which keeps the system busy and prevents other callers responding to the promotional stimulus from reaching the operator, answering machine or other prepared recording facility. Add to this the time consumed in taking down the pledge or order, the applicable credit card number, the mailing or return address and the like, and you can see the practical failure of the entire promotion right there, particularly if the promotion is broadcast on a very large scale that is supposed to generate myriads of calls in a matter of seconds.

To meet such demand, the subject invention merely captures the subscriber telephone numbers of the telephone sets 18 through which the calls are made in response to a broadcast stimulus Block 23 represents an automatic number identification system (ANI) for that purpose. While such ANI's have been used for purposes such as pay-per-view television, their lack of use in conjunction with the other elements of the subject invention up to now has precluded the evolution of a response system that could handle wide-area promotions of great impact.

Unlike human operators, phone answering machines and other voice recording devices, the subject invention, in its purest form, simply ignores any utterance attempted to be conveyed by a recipient through any telephone set 18 when responding to the broadcast promotion 22.

Of course, where automatic number identification (ANI) still is unavailable, even the subject invention has to make a certain exception to that general principle, so that substantially all calls may be received, even from some rural exchanges and certain other areas waiting for ANI capability, as more fully disclosed below. At the same time, the needs of the system and of the great majority of callers 16 is satisfied by the rapid ANI 23 without keeping the lines busy for more than a moment.

In this respect, the electronic capturing of a calling subscriber's telephone number takes place within a fraction of a second after the caller has completed dialing the promoted telephone number, such as (800) PRO-DUCT. In order to prompt the caller to hang up his or her telephone as soon as possible thereafter, the system automatically confirms to substantially all callers while on line during initial call that their calls have been received. This can be done by a synthesized or preferably digitized voice automatically to cut down the time factor. Of course, as little as a short beep back to the caller via telephone set 18 immediately after capture of the subscriber's telephone number may be sufficient and most time effective. Within the scope of the subject invention, a message that their call will be confirmed by a beep and that they will be called back later may be displayed or otherwise uttered or published right along with the display of the phone number (800) PRO-DUCT. The selection of any of these or other methods within the scope of the subject invention for confirming that a call has been registered and will be returned, will most likely depend on (a) which method will cause the caller to hang up most quickly, and (b) will preserve the callers' goodwill nevertheless. To prevent people from blocking the system, a disconnect as indicated at 24 may be employed to disconnect the callers' telephone sets 18 after confirmation has been issued at 30 to these callers 16 as indicated at 33 that their calls have been received. Existing software-defined disconnects in many telephone systems now disconnect a caller's line after the called party has hung up.

After each caller thus has politely been caused to hang up or has been disconnected in the shortest possible time, the system is obviously free from instant to instant to receive other calls, whereby substantially all calls of recipients 16 using their telephone sets 18 to respond to broadcast promotions 22 are automatically received before the viewers' enthusiasm dies down.

Unlike pay-per-view and prior art automatic number identification systems, the systems of the subject invention will not typically ask the caller 16 to use his or her keypad 25 to key in any information when first responding to a promotion 22. In fact, the invention in its purest form does not ask any information at that point. A significant exception presently contemplated would arise if the local exchange in his or her case simply did not have any ANI capability. In that case, in the interest of accommodating the needs of such persons, even a system according to the subject invention may route such calls to live attendants taking down the caller's phone number and inserting it through a keypad into the ANI 23. An automatic call distributor may be used for that purpose. In such a case, the attendant may find that he or she might as well take the caller's pledge or order, unless a high-call rate restricts him or her time-wise to taking only the caller's phone number. Another exception presently contemplated would involve live attendants in voice conversation with some of the callers for other reasons, e.g. with randomly selected callers for informing them that they have been selected to win a prize or for permitting them to participate in a special event. However, these are isolated instances which are dwarfed by the overwhelming majority of cases.

It is thus true for the majority of callers that any receipt of information conveyed by recipients 16 using the telephone sets 18 having rotary or keypad-type dialing facilities 25 to respond to the broadcast promotion 22 is confined to the capturing of subscriber telephone numbers where a telephone system is so equipped, such as at 23, and to information conveyed through the dialing facilities. As already mentioned above, such information is, for instance, the dialing of the system telephone number, such as (800) PRO-DUCT, or a (900) area code or other specific phone number.

The subscriber telephone numbers identified by the ANI 23 are captured by a communication controller (CC) 26 which in turn passes such captured telephone number information to a transactional processor computer (TPC) 27. The ANI 23 may also pass to the CC 26 the last four digits of the dialed number, such as "DUCT," or such other digits as will identify the product or service called for by a person 16 in the response to one or more broadcast promotions 22. The CC 26 may include a conventional type of converter, known as "protocol converter," which converts information from one language or format to another, such as can be handled by the TPC 27, and at least buffer-type storage capacity.

The TPC 27 may establish a data base of customer telephone numbers from the information received via CC 26 and may comprise a main frame or microcomputer, or a PC for housing all necessary data bases. Where regulations permit, at least part of the function, hardware and application software of the TPC 27 may be incorporated in the CC 26.

A phantom line 29 separates regular telephone exchanges 20 from the special equipment 23, 26, 27, etc. However, such equipment may actually be located at a telephone central office itself, where regulations so permit. Where a broadcast promotion is nationwide or otherwise is to cover a particularly large area, several ANI's 23 may be located at different node points distributed over the country or other wide area. The TPC 27 may then be centralized, but the subject invention is flexible in that respect as well.

Technology already exists for generating a confirmation of the above mentioned type as indicated by a block 30 in FIG. 1. That facility 30 for providing callers with an audible confirmation and/or a message that they will be called back may in fact be located in or at the ANI 23 such as in the form of a mass announcement node.

The double arrow 33 in FIG. 1 indicates that information flows both ways, namely through the telephone exchanges 20 to the ANI 23 as far as capturing the subscribers' telephone numbers and elements of the called system number (e.g. "DUCT") is concerned, and from the equipment connected to ANI 23 back through the telephone exchanges 20 to the calling telephone sets 18 as far as a brief confirmation of the receipt and an expressed or implied promise of subsequent return of each call is concerned.

As indicated by a line 31, the transactional processor 27 interfaces with a communications processor shown as CP 32. Such equipment may be of a conventional or state-of-the art type per se and may be multiplied as required for necessary capacity of the system.

The callers' captured telephone numbers are thus downloaded into the CP 32, preferably preceded by the message which the system will transmit to the persons 16 when calling them subsequently as more fully disclosed below. All this occurs very rapidly and, ideally, within seconds of a broadcast promotional stimulus. However, while the invention is very stingy when it comes to occupying the system during the initial calls, it is more generous when it comes to returning the calls, thereby making up for whatever curtness that may have been perceived by viewers 16 when they placed their initial call in immediate response to a broadcast promotion.

Now that the ninety seconds or so during which the system has received the large majority of calls of recipients of the broadcast promotion 22 and has captured their phone numbers have passed, the CP 32 can be more generous in returning such phone calls.

In fact, since callers have been assured, as indicated at 30 and by the double arrow 33, that their calls will be returned, there is no hurry and the system could wait and keep incoming lines clear for the above mentioned next five minutes until the remaining ten to fifteen percent of viewers 16 that will respond to the broadcast promotion 22 has called the system number (800) PRO-DUCT and has had their phone numbers captured at 23 and recorded or registered at 32. This would give the system additional time to effect a credit card and name and address verification from a credit card and name and address data base file (N&A) which is shown at 36 and which may have been obtained from a credit card company and/or may have been put together from previous orders or dealings. It may be necessary at that point to have such credit information arranged in terms of phone numbers or to postpone such credit check at 36 until the callers have been called back and dialed-in their credit card numbers during the response completing phase.

At any rate, the system or CP 32 uses the electronically captured subscriber telephone numbers to call on multitudes of telephone sets 18 at a time until substantially all of the calls have been returned. This is not intended to mean that the CP 32 will call on several times 10,000 over a period of time, if the CP has a capability of returning 10,000 calls and if not more than 10,000 viewers 16 have called.

In that case, the expression "multitudes" refers to the number of telephone sets within the 10,000 call capacity or within such smaller or larger capacity of the CP 32 as may be manageable with a single burst of return calls. However, where the number of captured calls exceeds the capacity of the CP 32, as will typically be the case, then the expression "multitudes" refers to the multiple of the burst of return calls that can be handled by the system at any time.

When thus reaching multitudes of subscribers 16, the system 10 will prompt them to complete their responses to the broadcast promotion 22. As indicated above, that will be on the return call by the system, minutes after the viewers 16 have first called through their telephones and have had their phone numbers captured for such a return call. The technology already exists for electronically prompting all persons who answer the calls on their multitudes of telephone sets 18 to complete their responses to the broadcast promotion 22 through their telephone sets while on line during the return call. For instance, the CP 32 may include a synthesized or digitized voice facility which greets the people picking up the phone in response to a return call and which asks them to place now their order or make their pledge, depending on the nature of the broadcast promotion. An arrow 38 in FIG. 1 indicates the travel of such synthesized or digitized voice prompt from the system or CP 32 through the telephone exchanges and subscriber lines and telephone sets 18 to the persons 16 answering the return call by the system.

According to an embodiment of the invention, persons who answer the return call on telephone sets 18 having keypad-type dialing facilities are prompted via 38 to complete their responses to the broadcast promotion 22 through their keypad-type dialing facilities 25.

For instance, the synthesized or digitized voice may ask them to key-in their credit card number. The credit card information thus produced proceeds via line 39 to the CP 32 where it is subjected to a credit check and name and address verification at 36 via response processor 42.

The synthesized or digitized voice may then request each person 16 who has answered a return call and for whom the verification at 36 has been satisfactory, to key-in his or her response to the broadcast promotion 22, such as in the form of an order or pledge and such as by depressing specific pushbuttons in a keypad 25. Depending on the nature of the data base at 36, a system could then also verify to the particular person his or her address to which the particular product will be sent or other response mailed. The synthesized or digitized voice could then ask the person to depress a specific button at 25, if that address is correct, or a different button if the person wishes the ordered product or other response to be sent to another address than what is in the data base at 36 for that person.

On the other hand, since the system, for the above mentioned reasons, always has more time to return the calls than to take the initial calls, this may be the time to give the responding viewer 16 an opportunity to talk. For instance, the responding viewer 16 could be asked about his or her desired mailing address for the particular item, and so forth. A live operator or attendant or an answer recording facility could be used for that purpose for subsequent replay and/or transcription.

In principle, whatever can be dialed in by a keypad-type facility 25 could be dialed in by the old rotary dial. For instance, one could dial in the digits of a credit card number that way. However, phone systems are not usually equipped to handle credit card numbers dialed in with a rotary dial, and it may thus be necessary for the system to make an exception to its goal of optimum automation for the case of telephones still equipped with rotary dials. For that case, the CP 32 could be set up as a voice interactive computer or a live operator or attendant could be provided for that purpose.

However, since rotary dials are in the process of eventually disappearing from the scene, the full benefits of the subject invention are still attainable in time.

As indicated by a line 41 leading from the CP and by a block 42 labelled RESP. PROC., the orders, pledges or other responses generated by and received through the system are processed. This may, for instance, be done at the location of the provider of the service or product, indicated by a block 43 to which the response processor 42 is connected by a line 44.

According to an embodiment of the invention, the response processor 42 may include the same equipment as the TPC 27 and, as indicated by a dotted line 45, may serve as a backup thereof in order to prevent a loss of captured phone numbers in case of a TPC breakdown.

Ordered products may thus be billed or, if they already have been charged through credit cards, may be sent out to the viewers 16 or radio listeners responding to a broadcast promotion 22. As indicated by a line 46 between the service or product provider 43 and the one-way broadcast medium 12, broadcast promotions 22 typically have their impetus at the provider, who may have an advertising department or who may engage an advertising agency and all necessary production facilities for that purpose.

Within the scope of the subject invention, the system so far disclosed divides methods herein discussed into a call receiving phase and a response completing phase carried out at least minutes after termination of the call receiving phase. By way of example, a call receiving phase has been disclosed above with the aid of components 23, 24, 26, 27, 30 and 33 in FIG. 1. The subsequent response completing phase has been described above by reference to components 32, 38 and 39 in FIG. 1.

FIG. 1 uses a # symbol as shown at 13 to symbolize a system telephone number or other stimulus broadcast for prompting the recipients 16 of the broadcast promotion 22 to respond through their telephone sets 18, as disclosed above. An embodiment of the subject invention then assesses a length of time during which substantially all of these recipients 16 responding to that # stimulus will have made their response through their telephone sets 18, such as by dialing "800 PRO-DUCT" with their keypads 25. An example of such an assessment has been given in the Background of the Invention where it was mentioned that most viewers 16 who want to respond by telephone 18 will attempt to do so within less than two minutes after a broadcast stimulus # therefor. By way of representative example, it was there stated that over eighty-five percent of all such phone calls will be attempted during the first ninety seconds, followed by ten to fifteen percent within the next five minutes after the broadcast stimulus #.

There may be different response times for different kind of promotions, but it can be statistically determined or deduced from prior similar promotions what a typical response time will be. Computerized equipment of the type mentioned above in connection with components 27, 32 and 42 may be employed for that purpose. In this or any other manner within the scope of the subject invention, a length of time during which substantially all of the recipients 16 responding to the broadcast stimulus # will have made their responses through their telephone sets 18 is assessed. In the above mentioned representative example, such length of time was a total of six and a half minutes.

Accordingly, pursuant to the currently disclosed embodiment of the subject invention, the response completing phase would only be started by the system 10 after these six and a half minutes after broadcast of the stimulus # have elapsed. To be on the safe side under our example, a ten-minute delay could be built into the CP 32 to assure that the system only starts at some ten minute delay to call on the telephone sets 18 by using the subscriber telephone numbers captured at 26 et seq. This or any such delay within the scope of the subject invention may be timed after the stimulus # has been broadcast at 12 through the sets 13. Depending on the length and kind of broadcast promotion 22, the above mentioned delay observed by the CP before that CP 32 starts returning calls to the viewers 16, may be made to start after the end of the particular broadcast promotion 22. Where faster action is desired, and when the kind of the program 22 so permits, such delay may be initiated after a subscriber's telephone number has been captured at 26.

The subject invention also addresses itself to the above mentioned problem caused by various promotional systems that call on telephone subscribers en masse with various solicitations that are neither desired, nor particularly appreciated. The subject invention converts that nuisance into a desired commodity by using its system to make calls only if the called party has in some manner indicated that such calls are authorized. As disclosed above, this may be done by capturing the responding viewer's or listener's telephone numbers such as at 23 and 26 in FIG. 1 and by using such captured telephone number information via 27 and 32 some times thereafter to make calls as disclosed above via 38 and 39. The equipment used for such purpose may in principle be the same at 32 as the equipment that is now making the above mentioned unsolicited phone calls. Outbound dialers, voice response equipment and voice interactive computers already exist for use as or in the CP 32.

The return calls established through the CP 32 may be controlled, if desired, from a single or centralized location so that the ANI-generated information may be passed to and downloaded a the centralized location for initiating the return calls.

Figure 2:
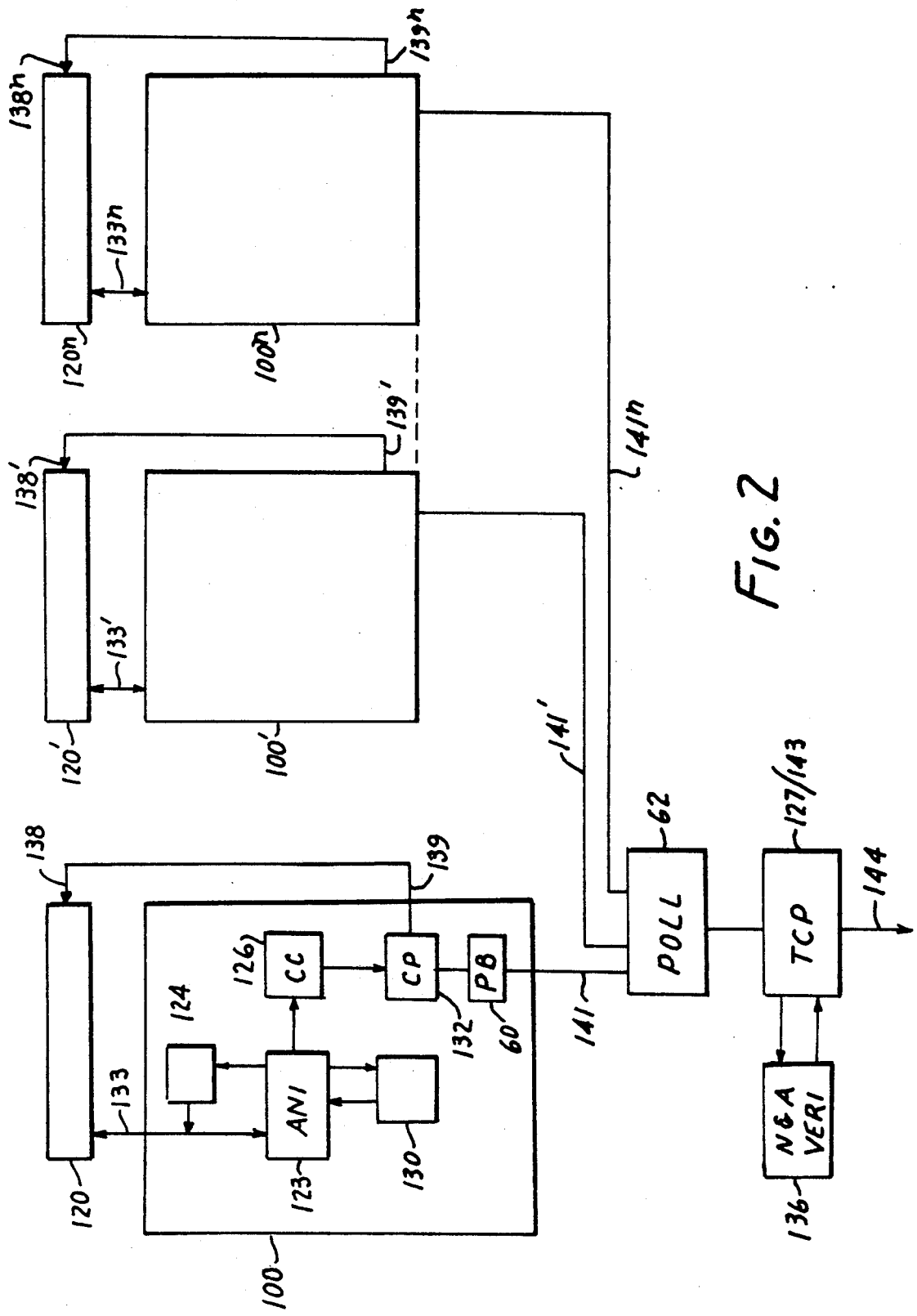
FIG. 2 is a block diagram of apparatus for implementing one manner of practicing the subject invention.

Alternatively, as shown in FIG. 2, a plurality of subsystems 100, 100', ... $100^n$ may be geographically distributed over a wide area (located, e.g., at telephone company respective central offices). Components shown in FIG. 2 are similar to and serve the same functions as corresponding components of FIG. 1, for FIG. 2 components having reference numerals the last two digits of which are identical with the reference numerals of components of FIG. 1. Although not shown in FIG. 2, each of the subsystems 100, 100', ... $100^n$ communicates with telephone sets through their respective telephone exchanges 120, 120', ... $120^n$, with subscribers responding to broadcast promotions, as illustrated in FIG. 1. Each of the subsystems 100', ... $100^n$ of FIG. 2 is similar to and contains components corresponding to those shown within the subsystem block 100, and accordingly, the following description and operation of subsystem 100 applies as well to each of the subsystems 100', ... $100^n$.

Referring to subsystem 100 as illustrative, subscribers' telephone numbers and the promotion identifier (e.g., "DUCT", the last four digits of the called telephone number), for telephone calls responding to the broadcast promotion which are received through subsystem 100 (e.g. through one of a plurality of geographically distributed telephone company central offices), are identified by ANI 123 and passed to the communications controller CC 126. During the system's response completing phase, the callers' captured telephone numbers are downloaded into the communications processor CP 132, preferably preceded by the message which the subsystem 100 will transmit to the recipients of the return calls. The electronically captured subscriber telephone numbers of calls received through the subsystem 100 (e.g. through a particular central office) are used to call on multitudes of telephone sets at a time through the subsystem 100 (through the same central office), preferably until substantially all of the calls received through the subsystem 100 have been returned. The outgoing message will prompt the recipients of such calls to complete their responses to the broadcast promotion, and information generated by and received through the subsystem 100 (including the subscriber responses to the broadcast promotion, the subscriber telephone numbers and the promotion identifier number) are stored in polling buffer PB 60.

Preferably, but not necessarily, the response completing phases of each of the subsystems 100, 100', ... $100^n$ are carried out simultaneously. At the conclusion of the response completing phase, or from time to time during the response completing phase, the information generated by and received through the plurality of subsystems 100, 100', ... $100^n$ is polled by polling means 62 communicating with each of the subsystems (e.g., with the polling buffer PB 60 of subsystem 100). The polling means 62 is preferably located at a single or centralized location, e.g. at the location of one of the subsystems or at one of the telephone company's central offices. The polled information is then processed by centralized transactional processor computer TCP 127/143, which performs such functions as credit check and name and address verification at 136, and further processes the orders to the service/product provider (indicated in FIG. 1 at 43).

These and other modifications and variations within the spirit and scope of the subject invention are suggested to those skilled in the art by the subject extensive disclosure.

We claim:

1. A method of enhancing response to a broadcast promotion, comprising in combination the steps of:
   broadcasting said promotion over an essentially one-way mass medium;
   prompting recipients of that broadcast promotion to respond thereto through their telephone sets having different subscriber telephone numbers;
   at a plurality of locations, automatically receiving calls of recipients using their telephone sets to respond to said broadcast promotion, electronically capturing the subscriber telephone numbers of the telephone sets through which said calls are made, and automatically confirming to substantially all callers while on line during said calls that their calls have been received;

at said plurality of locations, subsequently using the electronically captured subscriber telephone numbers to call on multitudes of the telephone sets at a time, electronically prompting all persons who answer the calls on said multitudes of telephone sets to complete their responses to the broadcast promotion through their telephone sets while on line, and automatically receiving the completed responses while on line with said persons through their telephone sets; and communicating with said plurality of locations and polling information generated by said received calls and said returned calls.

2. A method as in claim 1, wherein during the step of using the captured subscriber telephone numbers, the calling on multitudes of the telephone sets at a time continues until substantially all of said calls have been returned.

3. A method as in claim 1, further including the step of processing the polled information.

4. A method in claim 1,
including the step of storing, at said plurality of locations, information generated by said received calls and said returned calls, and
wherein information stored at said plurality of locations is polled during said polling step.

5. A method as in claim 4, further including the step of processing the polled information.

6. A method as in claim 1, wherein:
any utterance attempted to be conveyed by a recipient through any telephone set when responding to said broadcast promotion is ignored in all but a minority of calls.

7. A method as in claim 1, wherein:
said telephone sets have dialing facilities; and
any receipt of information conveyed by recipients through their telephone sets when responding to said broadcast promotion is confined to said capturing of subscriber telephone numbers where a telephone system is so equipped, and to information conveyed through said dialing facilities.

8. A method as in claim 1, wherein:
said telephone sets have keypad-type dialing facilities; and
any receipt of information conveyed by recipients through their telephone sets having keypad-type dialing facilities when responding to said broadcast promotion is confined to said capturing of subscriber telephone numbers where a telephone system is so equipped, and to information conveyed through said keypad-type dialing facilities.

9. A method as in claim 1, wherein:
said telephone sets have keypad-type dialing facilities; and
said persons who answer the calls on telephone sets having keypad-type dialing facilities are prompted to complete their responses to the broadcast promotion through said keypad-type dialing facilities.

10. A method as in claim 1, including the step of:
automatically disconnecting said callers' telephone sets after confirming that their calls have been received.

11. A method as in claim 1, wherein:
during said communicating and polling step, the information polled includes response information generated by said returned calls.

12. A method as in claim 1, including the step of:
delaying initiation of the calling on said multitudes of the telephone sets by a predetermined length of time after the broadcast promotion.

13. A method as in claim I, including the steps of:
broadcasting a stimulus for prompting said recipients of the broadcast promotion to respond through their telephone sets; and
initiating the calling on said multitudes or the telephone sets after expiration of a predetermined length of time after said stimulus.

14. A method as in claim 1, including the steps of:
broadcasting a stimulus for prompting said recipients of the broadcast promotion to respond through their telephone sets;
assessing a length of time during which substantially all of said recipients responding to said stimulus will have made their responses through their telephone sets; and
initiating the calling on said multitudes of the telephone sets after expiration of said length of time after said stimulus.

15. A method of enhancing response to a promotion broadcast over an essentially one-way mass medium, wherein recipients of that broadcast promotion are prompted to respond thereto through their telephone sets having different subscriber telephone numbers, comprising in combination the steps of:
dividing said method into a call receiving phase and a response completing phase carried out at least minutes after termination of said call receiving phase;
shortening said call receiving phase relative to said response completing phase by, at a plurality of locations, automatically receiving calls of recipients using their telephone sets to respond to said broadcast promotion, electronically capturing the subscriber telephone numbers of the telephone sets through which said calls are made, and automatically confirming to substantially all callers while on line during said calls that their calls have been received;
subsequently carrying out the response completing phase by, at said plurality of locations, using the electronically captured subscriber telephone numbers to return said calls, prompting all persons who answer the calls on telephone sets to complete their responses to the broadcast promotion through their telephone sets while on line, and receiving the completed responses while on line with said persons through their telephone sets; and
communicating with said plurality of locations and polling information generated by said received calls and said returned calls.

16. A method as in claim 15, further including the step of processing the polled information.

17. A method as in claim 15,
including the step of storing, at said plurality of locations, information generated by said received calls and said returned calls, and
wherein information stored at said plurality of locations is polled during said polling step.

18. A method as in claim 17, further including the step of processing the polled information.

19. A method as in claim 15, including the step of:

positively limiting said call receiving phase as to maximum time duration by automatically disconnecting said callers' telephone sets after confirming that their calls have been received.

20. A method as in claim 15, wherein during the step of returning said calls, calling at said plurality of locations on multitudes of telephone sets at a time.

21. A method as in claim 15, including the steps of:
broadcasting a stimulus for prompting said recipients of the broadcast promotion to respond through their telephone sets;
assessing a length of time during which substantially all of said recipients responding to said stimulus will have made their responses through their telephone sets; and
starting said response completing phase only after expiration of said length of time after said stimulus.

22. A method as in claim 15, wherein:
during said communicating and polling step, the information polled includes response information generated by said returned calls.

23. A method as in claim 15, wherein:
in said response completing phase, using the electronically captured subscriber telephone numbers to return substantially all of said calls.

24. A method as in claim 15, wherein in said response completing phase:
using the electronically captured subscriber telephone numbers to automatically return said calls;
electronically prompting all persons who answer the calls to complete their responses to the broadcast promotion through their telephone sets while on line; and
automatically receiving the completed responses while on line with said persons through their telephone sets.

25. A method as in claim 15, including the step of:
delaying initiation of said response completing phase by a predetermined length of time after the broadcast promotion.

26. A method as in claim 15, including the steps of:
broadcasting a stimulus for prompting said recipients of the broadcast promotion to respond through their telephone sets; and
starting said response completing phase after expiration of a predetermined length of time after said stimulus.

27. In a system for enhancing response to a promotion broadcast over an essentially one-way mass medium wherein recipients of that broadcast promotion are prompted to respond thereto through their telephone sets having different subscriber telephone numbers, the improvement comprising in combination:
a plurality of subsystems each including in combination—
receiving means for receiving calls of recipients of said broadcast promotion using their telephone sets to respond to said broadcast promotion;
capturing means connected to said receiving means for capturing the subscriber telephone numbers of the telephone sets through which said calls received by said receiving means are made;
means connected to said receiving means for confirming to substantially all callers to the subsystem while on line during said received calls that their calls have been received; and
means for returning said received calls, including in combination—
means for calling on multitudes of the telephone sets at a time using the subscriber telephone numbers captured at that subsystem,
means for prompting all persons who answer the calls on said multitudes of telephone sets to complete their responses to the broadcast promotion through their telephone sets while on line, and
means for receiving the completed responses while on line with said persons through their telephone sets; and
polling means for communicating with each of said subsystems of said plurality for polling information generated by and received through said subsystems.

28. A system as in claim 27, wherein said means for calling is connected to said capturing means.

29. A system as in claim 27, further including processing means for processing information polled by said polling means.

30. A system as in claim 27, wherein:
each of said subsystems includes respective storage means for storing information generated by and received through its subsystem, and
said polling means communicates with each of said storage means for polling information stored thereat.

31. A system as in claim 29, further including processing means for processing information polled by said polling means.

32. A system as in claim 27, wherein:
said receiving means include means for confining any receipt of information conveyed by a recipient through any telephone set when responding to said broadcast promotion to said capturing of subscriber telephone numbers in all but a minority of calls.

33. A system as in claim 27, wherein:
said telephone sets have dialing facilities; and
said receiving means include means for confining any receipt of information conveyed by recipients through their telephone sets when responding to said broadcast promotion to said capturing of subscriber telephone numbers and to information conveyed through said dialing facilities.

34. A system as in claim 27, wherein;
said telephone sets have keypad-type dialing facilities; and
said receiving means include means for confining any receipt of information conveyed by recipients through their telephone sets having keypad-type dialing facilities when responding to said broadcast promotion to said capturing of subscriber telephone numbers where a telephone system is so equipped, and to information conveyed through said keypad-type dialing facilities.

35. A system as in claim 27, wherein:
said telephone sets have keypad-type dialing facilities; and
said prompting means include means for prompting all persons who answer the calls on telephone sets having keypad-type dialing facilities to complete their responses to the broadcast promotion through said keypad-type dialing facilities.

36. A system as in claim 27, wherein:
said receiving means include means for automatically disconnecting said callers' telephone sets after confirming that their calls have been received.

37. Apparatus as in claim 27, wherein:
said polling means communicates with each of said substreams in said plurality for polling information generated by said received calls and response information generated by the returned calls.

38. Apparatus as in claim 27, wherein said means for returning said received calls includes means for delaying initiation of the calling with the captured subscriber telephone numbers on said multitudes of the telephone sets by a predetermined length of time after the broadcast promotion.

* * * * *